US012586710B2

(12) United States Patent
Takahashi et al.

(10) Patent No.: US 12,586,710 B2
(45) Date of Patent: Mar. 24, 2026

(54) COIL COMPONENT

(71) Applicant: Murata Manufacturing Co., Ltd., Kyoto-fu (JP)

(72) Inventors: Hayato Takahashi, Nagaokakyo (JP); Yuki Kanbe, Nagaokakyo (JP); Kaori Takezawa, Nagaokakyo (JP); Tetsuya Tanimoto, Nagaokakyo (JP); Ryota Hashimoto, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 0 days.

(21) Appl. No.: 18/959,540

(22) Filed: Nov. 25, 2024

(65) Prior Publication Data

US 2025/0087406 A1 Mar. 13, 2025

Related U.S. Application Data

(63) Continuation of application No. 18/461,272, filed on Sep. 5, 2023, now Pat. No. 12,183,500.

(30) Foreign Application Priority Data

Sep. 9, 2022 (JP) ................................ 2022-143953

(51) Int. Cl.
*H01F 27/28* (2006.01)
*H01F 27/24* (2006.01)

(52) U.S. Cl.
CPC ......... *H01F 27/2823* (2013.01); *H01F 27/24* (2013.01)

(58) Field of Classification Search
CPC .. H01F 27/2823; H01F 27/24; H01F 27/2828; H01F 27/29; H01F 17/045; H01F 27/306; H01F 27/34
See application file for complete search history.

(56) References Cited

U.S. PATENT DOCUMENTS 11,164,692 B2 * 11/2021 Kawasaki ............... H01F 27/24
2019/0019612 A1 * 1/2019 Kawasaki ............... H01F 17/04
2019/0229697 A1 * 7/2019 Asai .................... H01F 27/2823
2020/0265985 A1 * 8/2020 Miyamoto ............ H01F 17/045
2020/0335261 A1 * 10/2020 Sukegawa ............ H01F 27/006
(Continued)

FOREIGN PATENT DOCUMENTS

JP 2017-011288 A 1/2017
JP 2022-069303 A 5/2022

*Primary Examiner* — Rexford N Barnie
*Assistant Examiner* — Michael J Warmflash
(74) *Attorney, Agent, or Firm* — Studebaker Brackett PLLC

(57) ABSTRACT

A coil component includes a drum core including a winding core portion and first and second flange portions, and first and second wires. A portion of the first wire that first comes into contact with an outer peripheral surface of the winding core portion when the first wire is traced from a first wire end to a second wire end is defined as a 1.0 turn portion of the first wire. A portion of the second wire where an angular position thereof about a central axis first coincides with an angular position of the 1.0 turn portion of the first wire, on a side of a second negative direction with respect to the central axis, when the second wire is traced from a first wire end to a second wire end is defined as a 1.0 turn portion of the second wire.

5 Claims, 4 Drawing Sheets

(56) References Cited

U.S. PATENT DOCUMENTS

| | | | | |
|---|---|---|---|---|
| 2022/0013274 | A1* | 1/2022 | Kawasaki | H01F 41/064 |
| 2022/0130583 | A1* | 4/2022 | Yamamoto | H01F 27/2823 |
| 2023/0012992 | A1* | 1/2023 | Itani | H01F 41/06 |
| 2025/0054682 | A1* | 2/2025 | Takahashi | H01F 27/292 |
| 2025/0253084 | A1* | 8/2025 | Nishikawa | H01F 27/006 |

* cited by examiner

COIL COMPONENT

CROSS-REFERENCE TO RELATED APPLICATION

This application is a Continuation of U.S. patent application Ser. No. 18/461,272, filed Sep. 5, 2023, which claims benefit of priority to Japanese Patent Application No. 2022-143953, filed Sep. 9, 2022, the entire content of which is incorporated herein by reference.

BACKGROUND

Technical Field

The present disclosure relates to a coil component.

Background Art

A coil component described in Japanese Patent Application Laid-Open No. 2017-11288 includes a winding core portion and two flange portions. The winding core portion has a quadrangular column shape. The two flange portions are connected to both ends of the winding core portion. Each of the flange portions protrudes outward from the winding core portion in a direction orthogonal to a central axis of the winding core portion. The material of the winding core portion and the flange portions is a magnetic material. The winding core portion and the flange portions constitute a core of the coil component. The coil component also includes first to fourth electrodes. The first electrode and the second electrode are located on the upper surface of one flange portion. The third electrode and the fourth electrode are located on the upper surface of the other flange portion.

The coil component includes a first wire and a second wire. The first wire and the second wire are coated conducting wires. The first wire is wound around the winding core portion. The second wire is wound around the winding core portion. A first wire end of the first wire is thermally crimped onto the first electrode. A second wire end of the first wire is thermally crimped onto the third electrode. A first wire end of the second wire is thermally crimped onto the second electrode. A second wire end of the second wire is thermally crimped onto the fourth electrode. Assuming that the number of turns of each wire increases by one every time the wire is wound around the winding core portion from the first wire end side to the second wire end side, the first turn of the first wire and the first turn of the second wire are adjacent to each other in a direction along the central axis of the winding core portion.

SUMMARY

In the coil component described in Japanese Patent Application Laid-Open No. 2017-11288, each of the electrodes and each of the wires are thermally crimped. At the time of the thermal crimping, the coating film of the wire may be deteriorated under the influence of heat. In particular, a portion of the wire close to the electrode is susceptible to heat.

In a case where a potential difference occurs between the first wire and the second wire at a position where the first wire and the second wire are adjacent to each other, a relatively large electric field is generated between the wires. In a case where the position where the deterioration occurs in the coating film of the wire and the position where the large electric field is generated between the wires coincide with each other, current leakage may occur at the position. That is, the withstand voltage characteristics of the coil component may be degraded.

The case where the wire is thermally crimped onto the electrode has been described above as an example, but in any case that may cause deterioration of the coating film when the wire is connected to the electrode, a similar problem will occur regardless of the connection method.

Accordingly, the present disclosure provides a coil component including a drum core including a winding core portion having a columnar shape, a first flange portion connected to a first end of the winding core portion in a direction along a central axis, and a second flange portion connected to a second end of the winding core portion opposite to the first end. Where a specific direction orthogonal to the central axis is a positive direction and a direction opposite to the positive direction is a negative direction, a first electrode is located on a side of the positive direction with respect to the central axis on an outer surface of the first flange portion, a second electrode is located on a side of the negative direction with respect to the central axis on the outer surface of the first flange portion, a third electrode is located on the side of the positive direction with respect to the central axis on an outer surface of the second flange portion, a fourth electrode is located on the side of the negative direction with respect to the central axis on the outer surface of the second flange portion, a first wire is wound around the winding core portion and has a first wire end connected to the first electrode and a second wire end connected to the third electrode, and a second wire is wound around the winding core portion in an equal direction to that of the first wire and has a first wire end connected to the second electrode and a second wire end connected to the fourth electrode. Assuming that a portion of the first wire that first comes into contact with an outer peripheral surface of the winding core portion when the first wire is traced from the first wire end to the second wire end is defined as a 1.0 turn portion of the first wire, and that the number of turns increases by 1 every time the first wire makes one round about the central axis from the first wire end toward the second wire end, and assuming that a portion of the second wire where an angular position thereof about the central axis first coincides with an angular position of the 1.0 turn portion of the first wire when the second wire is traced from the first wire end to the second wire end is defined as a 1.0 turn portion of the second wire, and that the number of turns increases by 1 every time the second wire makes one round about the central axis from the first wire end toward the second wire end, the 1.0 turn portion of the first wire is located on the side of the negative direction with respect to the central axis, and is away from the 1.0 turn portion of the second wire in the direction along the central axis.

In the above configuration, depending on the directions of the current flowing through the respective wires, a relatively large potential difference occurs between the 1.0 turn portion of the first wire and the 1.0 turn portion of the second wire. In the above configuration, the electric field generated between the 1.0 turn portions of the respective wires is smaller than that in a configuration in which the 1.0 turn portion of the first wire and the 1.0 turn portion of the second wire are wound adjacent to each other. As a result, it is possible to suppress degradation of the withstand voltage characteristics of the coil component.

Degradation of withstand voltage characteristics of a coil component is suppressed.

DETAILED DESCRIPTION

Figure 1:
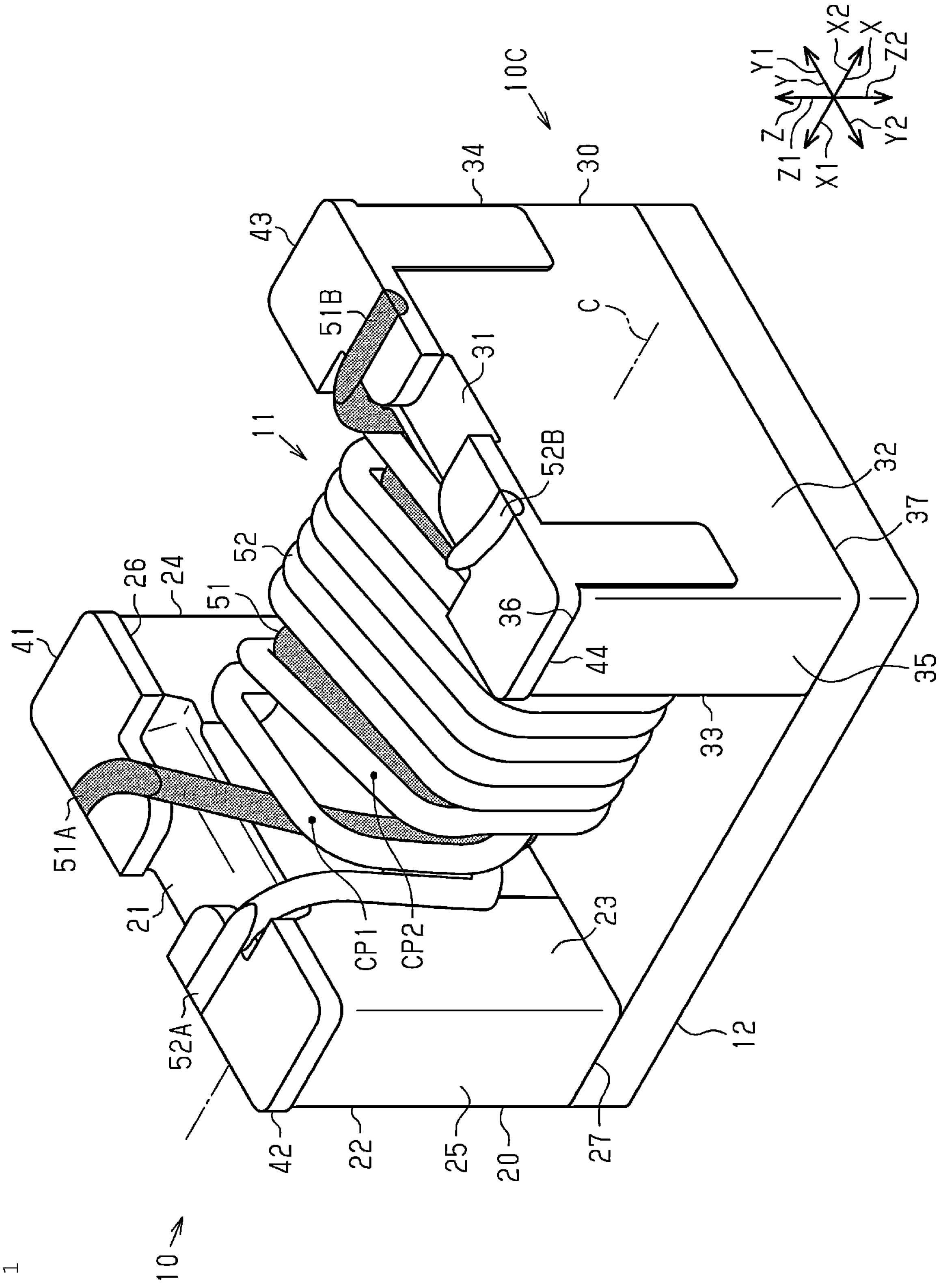
FIG. 1 is a perspective view of a coil component.

Hereinbelow, an embodiment of a coil component will be described. Note that, in the drawings, components may be illustrated in enlarged views to facilitate understanding. The dimensional ratios of the components may be different from the actual ones or those in another drawing.

Overall Configuration

As illustrated in FIG. 1, a coil component 10 includes a drum core 10C and a top plate 12.

The drum core 10C includes a winding core portion 11, a first flange portion 20, and a second flange portion 30.

The winding core portion 11 has a quadrangular column shape. A section of the winding core portion 11 orthogonal to a central axis C has a rectangular shape. The "rectangular shape" referred to herein is only required to be a rectangular shape as a whole having four sides, and includes a shape in which corners of a rectangle are chamfered. The material of the winding core portion 11 is a non-conductive material. Specifically, the material of the winding core portion 11 is, for example, alumina, Ni—Zn-based ferrite, resin, a mixture thereof, or the like.

Here, a specific axis parallel to the central axis C of the winding core portion 11 is defined as a first axis X. Also, a specific axis orthogonal to the first axis X is defined as a second axis Y. In the present embodiment, the second axis Y is parallel to two of the four sides of the winding core portion 11 when viewed in the direction along the first axis X. An axis orthogonal to both the first axis X and the second axis Y is defined as a third axis Z. In the present embodiment, the third axis Z is parallel to two of the four sides of the winding core portion 11 when viewed in the direction along the first axis X. One of the directions along the first axis X is defined as a first positive direction X1, and the other direction opposite to the first positive direction X1 is defined as a first negative direction X2. Similarly, one of the directions along the second axis Y is defined as a second positive direction Y1, and the other direction opposite to the second positive direction Y1 is defined as a second negative direction Y2. Also, one of the directions along the third axis Z is defined as a third positive direction Z1, and the other direction opposite to the third positive direction Z1 is defined as a third negative direction Z2.

As illustrated in FIG. 1, the first flange portion 20 is connected to a first end, which is an end of the winding core portion 11 facing in the first positive direction X1. The first flange portion 20 has a substantially quadrangular plate shape which is flat in the direction along the first axis X. When viewed in the direction along the first axis X, the sides of the first flange portion 20 are parallel to the corresponding sides of the winding core portion 11. Also, the first flange portion 20 protrudes outward with respect to the winding core portion 11 in the direction along the second axis Y and the direction along the third axis Z.

Here, in the first flange portion 20, a surface facing in the first positive direction X1 is referred to as a first outer end surface 22, and a surface facing in the first negative direction X2 is referred to as a first inner end surface 23. In the first flange portion 20, a surface facing in the second positive direction Y1 is referred to as a first side surface 24, and a surface facing in the second negative direction Y2 is referred to as a second side surface 25. In the first flange portion 20, a surface facing in the third positive direction Z1 is referred to as a first bottom surface 26, and a surface facing in the third negative direction Z2 is referred to as a first top surface 27.

The first outer end surface 22 and the first inner end surface 23 are surfaces orthogonal to the central axis C. The first bottom surface 26 and the first top surface 27 are surfaces parallel to the central axis C. The first bottom surface 26 and the first top surface 27 are surfaces parallel to a mounting surface facing a substrate when the coil component 10 is mounted on the substrate. The first side surface 24 and the second side surface 25 are surfaces parallel to the central axis C and orthogonal to the first bottom surface 26.

The first flange portion 20 has a recessed portion 21. The recessed portion 21 is recessed with respect to the first bottom surface 26 of the first flange portion 20. The recessed portion 21 is open to both sides of the first flange portion 20 in the direction along the first axis X. As a result, the first bottom surface 26 of the first flange portion 20 is divided into two portions with the recessed portion 21 interposed therebetween. The first flange portion 20 has a symmetrical shape in the direction along the second axis Y.

The second flange portion 30 is connected to a second end, which is an end of the winding core portion 11 facing in the first negative direction X2. The second flange portion 30 has a symmetrical shape with respect to the first flange portion 20 in the direction along the first axis X. That is, the second flange portion 30 has a substantially quadrangular plate shape.

Here, in the second flange portion 30, a surface facing in the first negative direction X2 is referred to as a second outer end surface 32, and a surface facing in the first positive direction X1 is referred to as a second inner end surface 33. In the second flange portion 30, a surface facing in the second positive direction Y1 is referred to as a third side surface 34, and a surface facing in the second negative direction Y2 is referred to as a fourth side surface 35. In the second flange portion 30, a surface facing in the third positive direction Z1 is referred to as a second bottom surface 36, and a surface facing in the third negative direction Z2 is referred to as a second top surface 37.

The second outer end surface 32 and the second inner end surface 33 are flat surfaces orthogonal to the central axis C. The second bottom surface 36 and the second top surface 37 are surfaces parallel to the central axis C. The second bottom surface 36 and the second top surface 37 are surfaces parallel to the mounting surface facing the substrate when the coil component 10 is mounted on the substrate. The third side surface 34 and the fourth side surface 35 are surfaces parallel to the central axis C and orthogonal to the second bottom surface 36.

The second flange portion 30 protrudes outward with respect to the winding core portion 11 in the direction along the second axis Y and the direction along the third axis Z. Also, the second flange portion 30 has a recessed portion 31. The recessed portion 31 is recessed with respect to the second bottom surface 36 of the second flange portion 30.

The material of the first flange portion 20 and the second flange portion 30 is the same non-conductive material as that of the winding core portion 11. The first flange portion 20 and the second flange portion 30 are integrally formed with the winding core portion 11.

In the present embodiment, the maximum dimension of the drum core 10C in the direction along the first axis X is 3.2 mm. The maximum dimension of the drum core 10C in the direction along the second axis Y is 2.5 mm. The maximum dimension of the drum core 10C in the direction along the third axis Z is 2.3 mm.

The top plate 12 has a rectangular plate shape. The top plate 12 is flat in the direction along the third axis Z. The long side of the top plate 12 is parallel to the first axis X. The short side of the top plate 12 is parallel to the second axis Y. The top plate 12 is located on the side of the third negative direction Z2 with respect to the drum core 10C. The top plate 12 is connected to both the first top surface 27 of the first flange portion 20 and the second top surface 37 of the second flange portion 30. That is, the top plate 12 straddles the first flange portion 20 and the second flange portion 30. The material of the top plate 12 is the same non-conductive material as that of the winding core portion 11. Note that, in FIG. 2 and subsequent figures, illustration of the top plate 12 is omitted.

The coil component 10 includes a first electrode 41, a second electrode 42, a third electrode 43, and a fourth electrode 44. The first electrode 41 is located on the outer surface of the first flange portion 20. Specifically, the first electrode 41 is located on the first bottom surface 26. The first electrode 41 is located on the side of the second positive direction Y1 with respect to the central axis C on the first bottom surface 26. Specifically, the first electrode 41 is located on the side of the second positive direction Y1 with respect to the recessed portion 21.

The second electrode 42 is located on the outer surface of the first flange portion 20. Specifically, the second electrode 42 is located on the first bottom surface 26. The second electrode 42 is located on the side of the second negative direction Y2 with respect to the central axis C on the first bottom surface 26. Specifically, the second electrode 42 is located on the side of the second negative direction Y2 with respect to the recessed portion 21.

The third electrode 43 is located on the outer surface of the second flange portion 30. Specifically, the third electrode 43 is located on the second bottom surface 36. The third electrode 43 is located on the side of the second positive direction Y1 with respect to the central axis C on the second bottom surface 36. Specifically, the third electrode 43 is located on the side of the second positive direction Y1 with respect to the recessed portion 31.

The fourth electrode 44 is located on the outer surface of the second flange portion 30. Specifically, the fourth electrode 44 is located on the second bottom surface 36. The fourth electrode 44 is located on the side of the second negative direction Y2 with respect to the central axis C on the second bottom surface 36. Specifically, the fourth electrode 44 is located on the side of the second negative direction Y2 with respect to the recessed portion 31.

Each of the first electrode 41 to the fourth electrode 44 has a metal layer and a plating layer. The material of the metal layer is silver. The metal layer is formed on the outer surface of the first flange portion 20 or the second flange portion 30. The plating layer includes three layers. The plating layer is formed by laminating copper, nickel, and tin in this order on the surface of the metal layer. In FIG. 1, illustration of the boundary between the metal layer and the plating layer is omitted. The end surface of the coil component 10 facing in the third positive direction Z1 is the mounting surface facing the substrate when the coil component 10 is mounted on the substrate.

First Wire and Second Wire

As illustrated in FIG. 1, the coil component 10 includes a first wire 51 and a second wire 52. The first wire 51 and the second wire 52 are wound around the winding core portion 11. Although not illustrated, the first wire 51 includes a copper wire and an insulating film. The insulating film covers the outer surface of the copper wire. The first wire 51 has a substantially circular shape in a section orthogonal to the direction in which the first wire 51 extends. The first wire 51 has an outer diameter of about 100 μm. The second wire 52 has the same configuration as the first wire 51. That is, the second wire 52 includes a copper wire and an insulating film. The outer diameter of the second wire 52 is about 100 μm. In FIG. 1, the first wire 51 is colored with dots.

Figure 2:
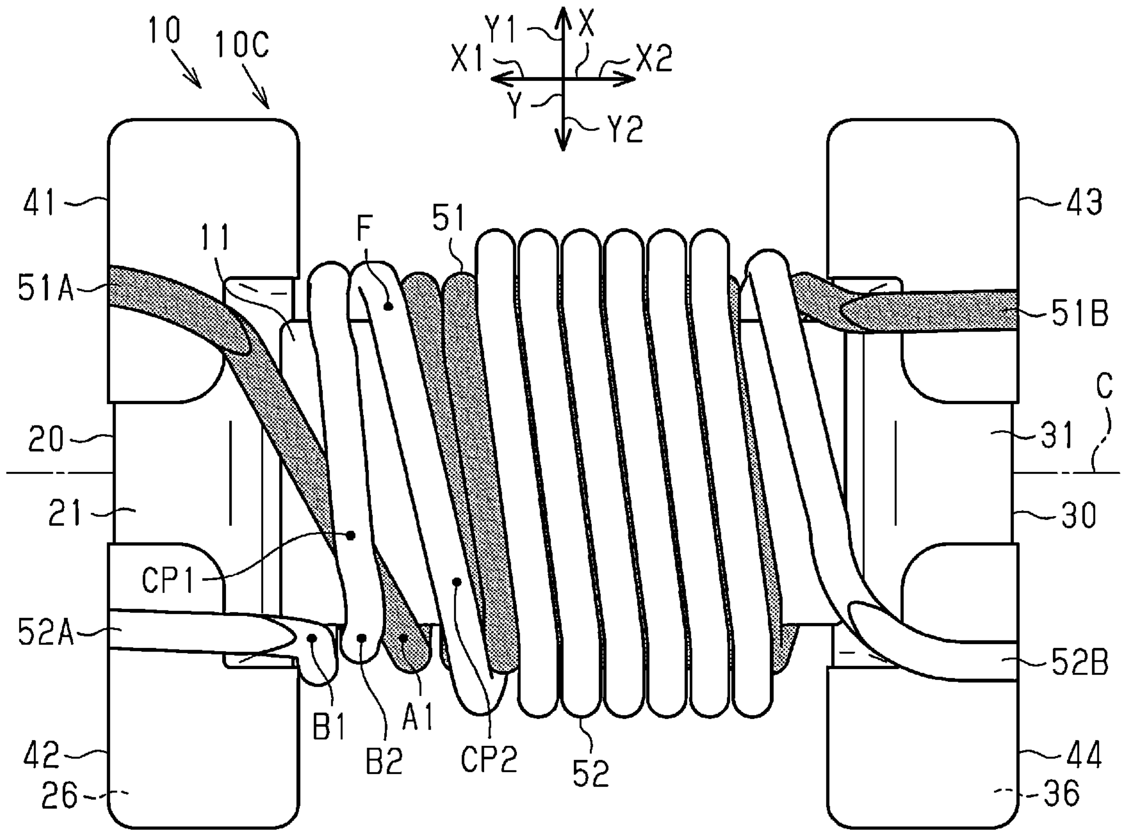
FIG. 2 is a plan view of the coil component when viewed in a third negative direction.

As illustrated in FIG. 2, a first wire end 51A of the first wire 51 is connected to the first electrode 41. A second wire end 51B of the first wire 51 is connected to the third electrode 43. The first wire end 51A and the second wire end 51B are connected to the corresponding electrodes by thermal crimping.

Here, a portion of the first wire 51 that first comes into contact with the outer peripheral surface of the winding core portion 11 when the first wire 51 is traced from the first wire end 51A to the second wire end 51B is defined as a 1.0 turn portion A1 of the first wire 51. In the present embodiment, the 1.0 turn portion A1 of the first wire 51 is located on the ridge line of the winding core portion 11 on the side of the second negative direction Y2 and the side of the third positive direction Z1. That is, the 1.0 turn portion A1 of the first wire 51 is located on the side of the second negative direction Y2 with respect to the central axis C.

In addition, assume that the number of turns increases by 1 every time the first wire 51 makes one round about the central axis C from the first wire end 51A toward the second wire end 51B. The first wire 51 is wound around the winding core portion 11 so as to travel clockwise as the number of turns increases when viewed in the first negative direction X2. Therefore, for example, when viewed in the first negative direction X2, a portion in which the first wire 51 has traveled by 36 degrees about the central axis C from the 1.0 turn portion A1 of the first wire 51 is a 1.1 turn portion of the first wire 51.

A first wire end 52A of the second wire 52 is connected to the second electrode 42. A second wire end 52B of the second wire 52 is connected to the fourth electrode 44. The first wire end 52A and the second wire end 52B are connected to the corresponding electrodes by thermal crimping.

Here, a portion of the second wire 52 where an angular position thereof about the central axis C first coincides with an angular position of the 1.0 turn portion A1 of the first wire 51 when the second wire 52 is traced from the first wire end 52A to the second wire end 52B is defined as a 1.0 turn portion B1 of the second wire 52. That is, in the present embodiment, the 1.0 turn portion B1 of the second wire 52 is located on a straight line connecting the ridge line of the winding core portion 11 on the side of the second negative direction Y2 and the side of the third positive direction Z1 to the central axis C when viewed in the direction along the first axis X. In the present embodiment, the second wire 52 first comes into contact with the outer peripheral surface of the winding core portion 11 at the 1.0 turn portion B1 of the second wire 52 when the second wire 52 is traced from the first wire end 52A to the second wire end 52B. The 1.0 turn portion B1 of the second wire 52 may not be in contact with the outer peripheral surface of the winding core portion 11.

In addition, assume that the number of turns increases by 1 every time the second wire 52 makes one round about the central axis C from the first wire end 52A toward the second wire end 52B. The second wire 52 is wound around the winding core portion 11 so as to travel clockwise as the number of turns increases when viewed in the first negative direction X2. That is, the second wire 52 is wound in the same direction as the first wire 51. A part of the second wire 52 is wound around the winding core portion 11 from the outside with respect to the first wire 51. In other words, a part of the second wire 52 is in contact with the outer surface of the first wire 51 on the side opposite to the central axis C.

Turns of First Wire and Second Wire

Figure 3:
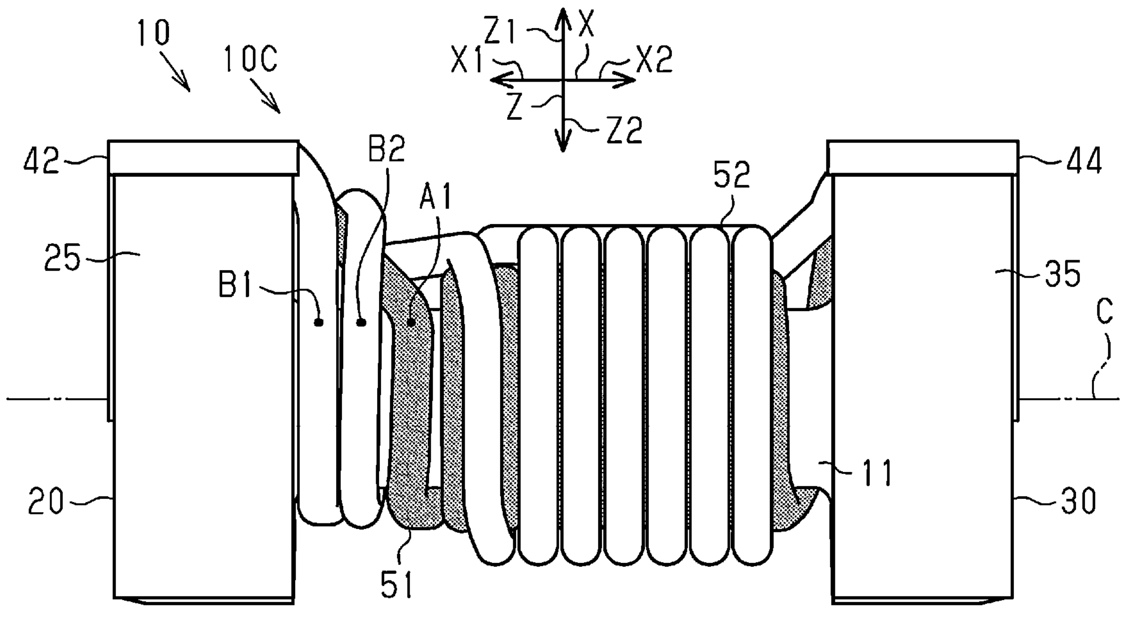
FIG. 3 is a side view of the coil component when viewed in a second positive direction.
Figure 4:
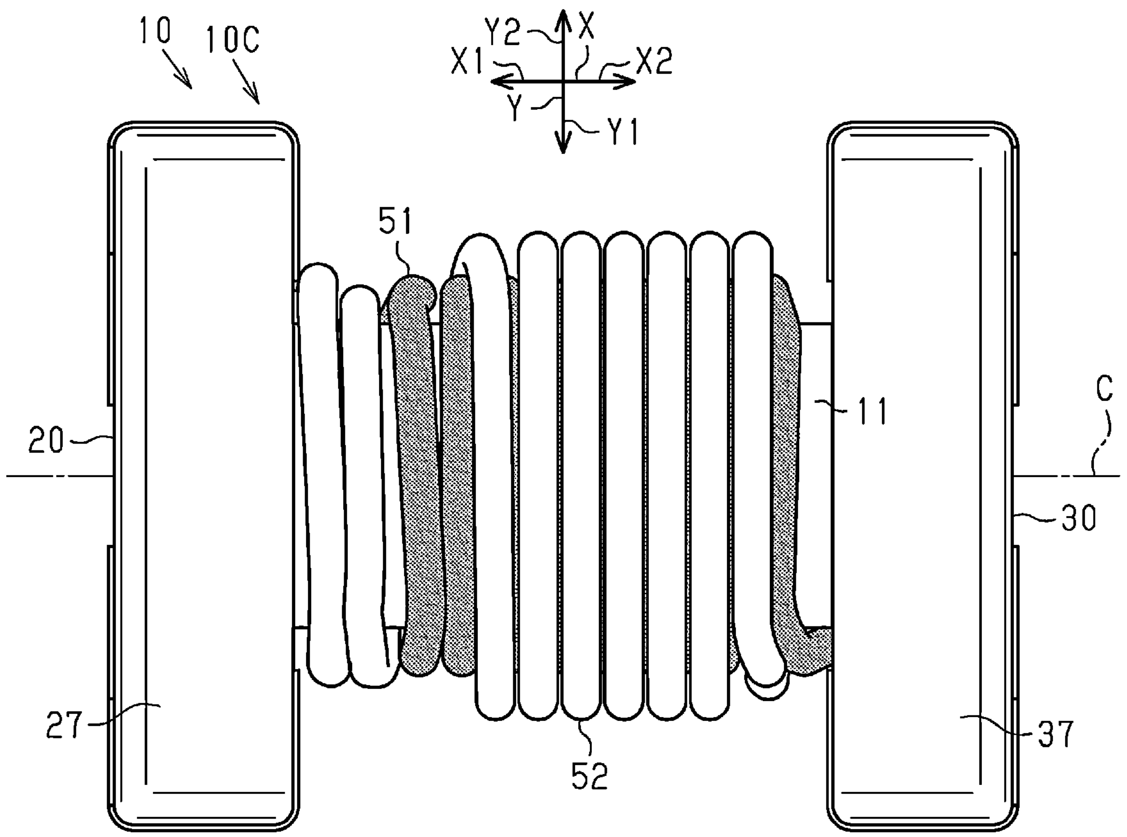
FIG. 4 is a plan view of the coil component when viewed in a third positive direction.
Figure 5:
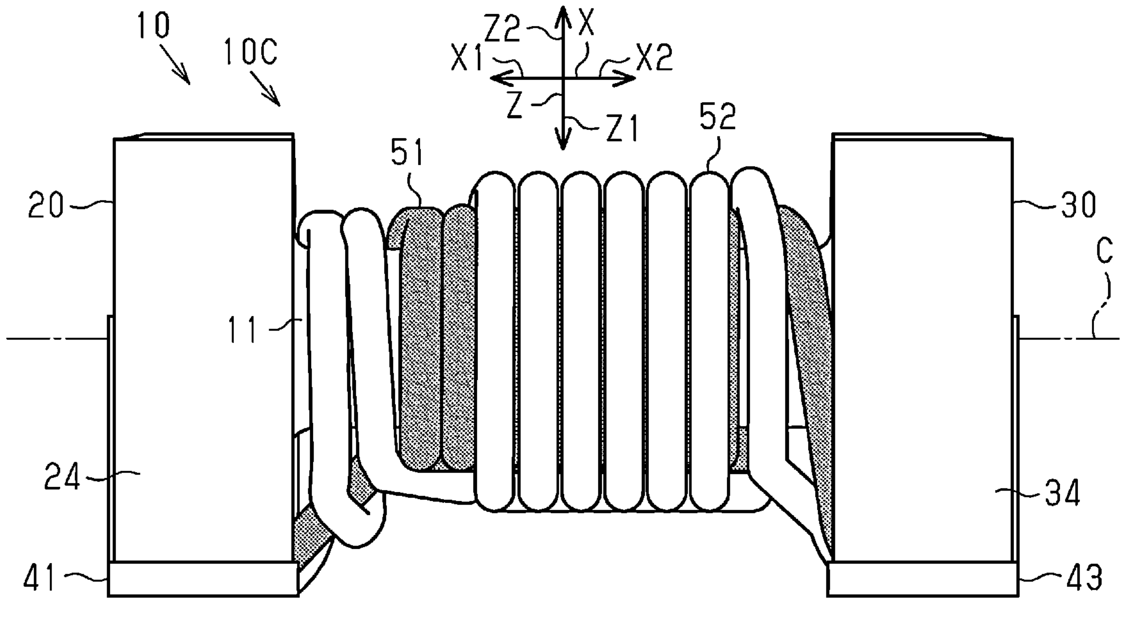
FIG. 5 is a side view of the coil component when viewed in a second negative direction.

As illustrated in FIGS. 3 to 5, the first wire 51 has the ninth turn but does not have the 10 turn. That is, the first wire 51 has a 9.0 turn portion, but does not have a 10.0 turn portion. Also, the first wire 51 is directly wound around the outer peripheral surface of the winding core portion 11 substantially in the range of the 1.0 turn portion A1 to the 9.0 turn portion.

As illustrated in FIG. 2, the second wire 52 has the ninth turn but does not have the 10 turn. That is, the second wire 52 has a 9.0 turn portion, but does not have a 10.0 turn portion. In the second wire 52, the range from the 1.0 turn portion B1 to the middle of the second turn is wound on the outer peripheral surface of the winding core portion 11. The second wire 52 is in contact with the first wire 51 from the outside substantially in the range of the middle of the second turn to the 9.0 turn portion. The "second turn" indicates a range of a 2.0 turn or more and less than a 3.0 turn of the wire. The same applies to the other numerical values.

The second wire 52 has a first cross portion CP1 that crosses a portion from the first wire end 51A to the 1.0 turn portion A1 of the first wire 51 from the outside. The first cross portion CP1 exists within a range of the 1.0 turn or more and less than a 2.0 turn of the second wire 52. Specifically, the first cross portion CP1 is an about 1.8 turn portion of the second wire 52. Also, the first cross portion CP1 is located on the side of the second negative direction Y2 with respect to the central axis C. In the present embodiment, when viewed in a direction orthogonal to the outer peripheral surface of the winding core portion 11, that is, in the third negative direction Z2, a portion where the center line of the second wire 52 crosses the center line of the first wire 51 is referred to as a "cross portion".

As illustrated in FIG. 3, a 2.0 turn portion B2 of the second wire 52 is adjacent to the 1.0 turn portion B1 of the second wire 52 in the direction along the central axis C. The 2.0 turn point B2 of the second wire 52 is located between the 1.0 turn portion A1 of the first wire 51 and the 1.0 turn portion B1 of the second wire 52 in the direction along the central axis C. That is, the 1.0 turn portion A1 of the first wire 51 is away from the 1.0 turn portion B1 of the second wire 52 in the direction along the central axis C.

Also, as illustrated in FIGS. 2 to 5, the range of the 1.0 turn or more and less than the 2.0 turn of the first wire 51 is away from the range of the 1.0 turn or more and less than the 2.0 turn of the second wire 52.

Here, a portion of the second wire 52 that first overlaps with an outside of a portion of the first wire 51 after the 1.0 turn portion A1 when the second wire 52 is traced from the first wire end 52A toward the second wire end 52B is defined as a first overlapping portion F. The first overlapping portion F exists within a range of the 2.0 turn or more and less than a 3.0 turn of the second wire 52. Specifically, the first overlapping portion F is located at an about 2.7 turn portion of the second wire 52. In the present embodiment, a portion where the center line of the second wire 52 is first located outside with respect to the center line of the first wire 51 is defined as a portion that overlaps outside. The "center line of the wire" is, in a section orthogonal to the direction in which the wire extends, a line passing through the geometric center of the section. That is, the center line of the wire extends in the winding direction at a portion of the wire wound around the winding core portion 11. In addition, the "outside" coincides with an outside in the circumferential direction around the central axis C.

As illustrated in FIG. 2, the second wire 52 has a second cross portion CP2 that crosses a portion from the 1.0 turn portion A1 to a 2.0 turn portion of the first wire 51 from the outside. The second cross portion CP2 exists within a range of the 2.0 turn or more and less than the 3.0 turn of the second wire 52. Specifically, the second cross portion CP2 is an about 2.9 turn portion of the second wire 52.

Figure 6:
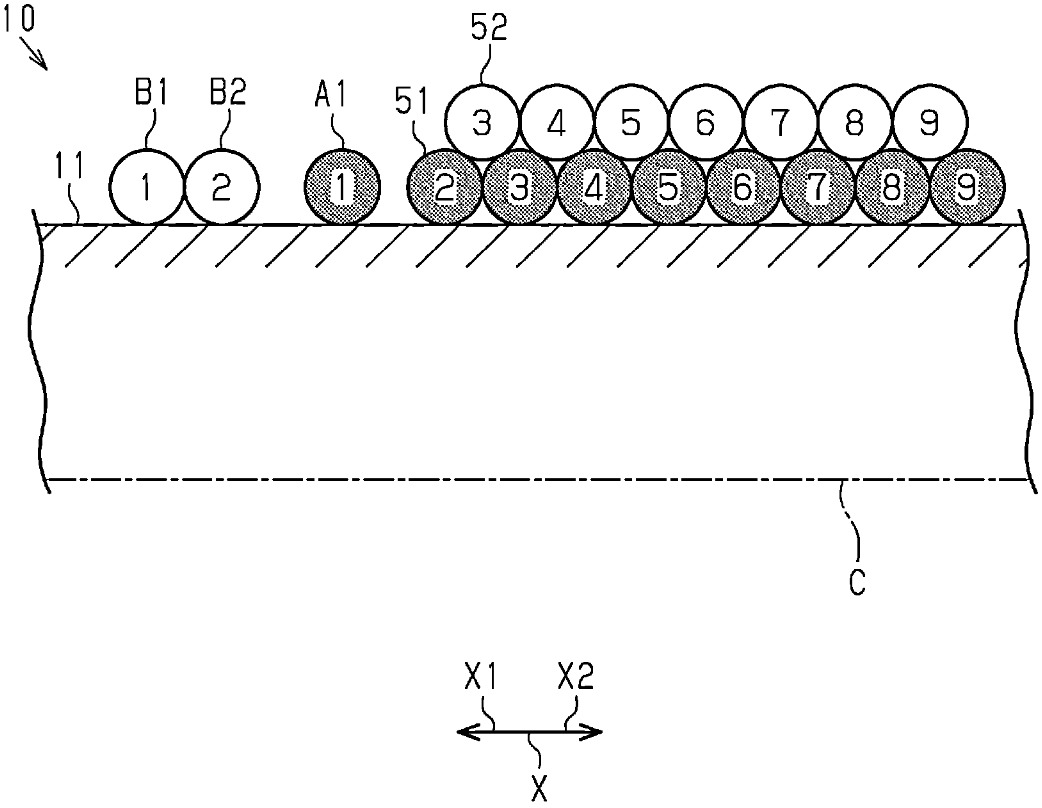
FIG. 6 is a sectional view of a part of the coil component in a section including a central axis of a winding core portion, a 1.0 turn portion of a first wire, and a 1.0 turn portion of a second wire.

As illustrated in FIG. 6, assume that the coil component 10 is viewed in a section including the central axis C, the 1.0 turn portion A1 of the first wire 51, and the 1.0 turn portion B1 of the second wire 52. In the direction along the central axis C, the 1.0 turn portion B1 of the second wire 52, the 2.0 turn portion B2 of the second wire 52, the 1.0 turn portion A1 of the first wire 51, and the 2.0 turn portion of the first wire 51 are arranged in this order from the side provided with the first flange portion 20 toward the side provided with the second flange portion 30.

Also, on the same section, in the direction along the central axis C, the 3.0 turn portion of the second wire 52 is located between the 2.0 turn portion and a 3.0 turn portion of the first wire 51. In the direction along the central axis C, a 4.0 turn portion of the second wire 52 is located between the 3.0 turn portion and a 4.0 turn portion of the first wire 51. Similarly, the second wire 52 is wound between the first wires 51 in the subsequent turns. That is, in a case where N is an arbitrary integer of 3 or more and less than 9, in the direction along the central axis C, an N turn portion of the second wire 52 is located between an (N−1) turn portion and an N turn portion of the first wire 51.

Method for Manufacturing Coil Component

A method for manufacturing the coil component 10 includes a preparation process, a first process, and a second process.

In the preparation process, the drum core 10C having the first electrode 41 to the fourth electrode 44 is prepared as follows.

First, in the preparation process, the drum core 10C is formed. First, a synthetic resin binder is mixed with ferrite powder, and a molded body formed by press molding is fired. Then, the molded body is deburred by a barrel to form the drum core 10C. Subsequently, in the drum core 10C, a paste containing silver is baked on the first bottom surface 26 of the first flange portion 20 and the second bottom surface 36 of the second flange portion 30. The paste is plated with copper, nickel, and tin in this order to form the respective electrodes.

Subsequently, in the first process, the first wire 51 is wound around the winding core portion 11 from the side provided with the first flange portion 20 toward the side provided with the second flange portion 30. Then, the first wire end 51A of the first wire 51 is thermally crimped onto the first electrode 41. Also, the second wire end 51B of the first wire 51 is thermally crimped onto the third electrode 43. At this time, the insulating film in the vicinity of the first wire end 51A of the first wire 51 may be peeled off. Similarly, the insulating film in the vicinity of the second wire end 51B of the first wire 51 may be peeled off.

Subsequently, in the second process, the second wire 52 is wound around the winding core portion 11 and the outer peripheral side of the first wire 51. Specifically, the first turn of the second wire 52 is first wound around the outer peripheral surface of the winding core portion 11. Then, in the middle of the first turn of the second wire 52, the second wire 52 is wound around the outside of the first wire 51 in the range of the first wire end 51A to the 1.0 turn portion A1 of the first wire 51. As a result, the first cross portion CP1 is formed. Subsequently, a part of the second turn of the second wire 52 is wound around the outer peripheral surface of the winding core portion 11. Then, in the middle of the second turn of the second wire 52, the second wire 52 is caused to overlap with the outside of the first turn of the first wire 51. As a result, the first overlapping portion F is formed. Then, in the middle of the second turn of the second wire 52, the second wire 52 is wound while approaching the side provided with the second flange portion 30 to cause the second wire 52 to cross the first wire 51 again. As a result, the second cross portion CP2 is formed. Then, the third and subsequent turns of the second wire 52 are wound around the outside of the first wire 51. Then, the first wire end 52A of the second wire 52 is thermally crimped onto the second electrode 42. Also, the second wire end 52B of the second wire 52 is thermally crimped onto the fourth electrode 44. At this time, the insulating film in the vicinity of the first wire end 52A of the second wire 52 may be peeled off. Similarly, the insulating film in the vicinity of the second wire end 52B of the second wire 52 may be peeled off.

Effects of Present Embodiment (1) In the common mode choke coil as in the above embodiment, depending on the directions of the current flowing through the first wire 51 and the second wire 52, a relatively large potential difference occurs between the 1.0 turn portion A1 of the first wire 51 and the 1.0 turn portion B1 of the second wire 52. In the above embodiment, the electric field generated between the 1.0 turn portions of the respective wires is smaller than that in a configuration in which the 1.0 turn portion A1 of the first wire 51 and the 1.0 turn portion B1 of the second wire 52 are wound adjacent to each other. As a result, it is possible to suppress degradation of the withstand voltage characteristics of the coil component 10.

Also, in particular, in a case where the wire end of each wire is connected to the electrode by thermal crimping, the insulating film of the wire may be deteriorated in the vicinity of the wire end. In some cases, the insulating film may be deteriorated up to the 1.0 turn portion of the wire. That is, in a case where the wire end of the wire is connected by thermal crimping, there is a high possibility that a position where the deterioration occurs in the insulating film and a position where the large electric field is generated between the wires coincide with each other. In this manner, the configuration of the above embodiment is particularly useful in the coil component 10 having the course of thermal crimping in the manufacturing process.

(2) In the above embodiment, the range of the 1.0 turn or more and less than the 2.0 turn of the first wire 51 is away from the range of the 1.0 turn or more and less than the 2.0 turn of the second wire 52. That is, in this configuration, the wires are not in contact with each other over a wide range of the first turn of the first wire 51 and the first turn of the second wire 52. Therefore, the electric field generated between the two wires can be reduced more effectively.

(3) In the above embodiment, the 2.0 turn portion B2 of the second wire 52 is located between the 1.0 turn portion B1 of the second wire 52 and the 1.0 turn portion A1 of the first wire 51 in the direction along the central axis C. Therefore, in a case where the 1.0 turn portion B1 of the second wire 52 is about to move in the direction along the central axis C, the 1.0 turn portion B1 of the second wire 52 is blocked by the 2.0 turn portion B2 of the second wire 52. That is, the 1.0 turn portion B1 of the second wire 52 is less likely to move in a direction of approaching the 1.0 turn portion A1 of the first wire 51. According to the above configuration, the 1.0 turn portion A1 of the first wire 51 and the 1.0 turn portion B1 of the second wire 52 can reliably be away from each other.

(4) In a configuration in which the same turns of the wires are wound adjacent to each other, the frequency at which the impedance is maxim is higher than in the configuration in which the same turns of the first wire 51 and the second wire 52 are wound away from each other. According to the above embodiment, the same turns of the wires are wound adjacent to each other in the third and subsequent turns. That is, according to the above configuration, preferable impedance characteristics can be obtained particularly in a high frequency region.

(5) In the above embodiment, the first overlapping portion F exists within the range of the 2.0 turn or more and less than the 3.0 turn of the second wire 52. That is, the second wire 52 is wound from the outside with respect to the first wire 51 at an early stage after the 2.0 turn portion B2. According to this configuration, it is not necessary to secure a large space for winding the second wire 52 on the outer peripheral surface of the winding core portion 11.

(6) In the above embodiment, the first cross portion CP1 exists within the range of the 1.0 turn or more and less than the 2.0 turn of the second wire 52. According to the above configuration, the 2.0 turn portion B2 of the second wire 52 can reliably be arranged between the 1.0 turn portion A1 of the first wire 51 and the 1.0 turn portion B1 of the second wire 52.

(7) In the above embodiment, the first cross portion CP1 is located on the side of the second negative direction Y2 with respect to the central axis C. According to the above configuration, the first cross portion CP1 is located closer to the winding core portion 11 than in a configuration in which the first cross portion CP1 is located on the side of the second positive direction Y1 with respect to the central axis C. Since the first cross portion CP1 is located at a position closer to the winding core portion 11, the first cross portion CP1 is hardly displaced.

Modification Examples

The present embodiment can be modified as follows. The present embodiment and the following modification examples can be carried out in combination with each other within a range not technically contradictory.

In the above embodiment, the configuration of the coil component 10 is not limited. For example, the top plate 12 can be omitted from the coil component 10. The shape of the first flange portion 20 is not limited to the shape in the above embodiment. For example, the recessed portion 21 can be omitted from the first flange portion 20.

In the above embodiment, the winding core portion 11 may not have a quadrangular column shape. For example, the sectional shape of the winding core portion 11 may be a circular shape, an elliptical shape, or a polygonal shape other than a quadrangular shape.

In the above embodiment, the ridge line of the winding core portion 11 may be chamfered. That is, the boundary between the outer peripheral surfaces includes, for example, a curved surface formed by round chamfering a corner formed by adjacent flat surfaces.

In the above embodiment, the shape and the dimension of the drum core 10C are not limited to the examples in the above embodiment.

In the above embodiment, the material of each of the electrodes is not limited to the example in the above embodiment. For example, the material of the plating layer in each of the electrodes may be a nickel alloy. Each of the electrodes may have no plating layer to expose a conductive metal layer. Each of the electrodes may be a plate-shaped metal terminal.

In the above embodiment, the outer diameters of the first wire 51 and the second wire 52 are not limited to the examples in the above embodiment.

In the above embodiment, the position of the first cross portion CP1 is not limited to the example in the above embodiment. For example, the first cross portion CP1 may be located on the side of the second positive direction Y1 with respect to the central axis C. The second wire 52 may not have the first cross portion CP1. That is, the 2.0 turn portion B2 of the second wire 52 may be located on the side of the first negative direction X2 with respect to the 1.0 turn portion A1 of the first wire 51.

In the above embodiment, the position of the first overlapping portion F is not limited to the position in the above embodiment. That is, the first overlapping portion F may exist at a position less than the 2.0 turn portion B2 of the second wire 52, or at a position of the 3.0 turn portion or more of the second wire 52.

The second wire 52 is not required to have a portion wound from the outside with respect to the first wire 51. For example, the first wire 51 and the second wire 52 may be located alternately in order of the first wire 51, the second wire 52, the first wire 51, the second wire 52 . . . in the direction along the central axis C on the outer peripheral surface of the winding core portion 11. In this case as well, the effect of (1) can be obtained as long as the 1.0 turn portion A1 of the first wire 51 and the 1.0 turn portion B1 of the second wire 52 are away from each other.

In the above embodiment, the 3.0 turn portion of the second wire 52 is not required to be located between the 2.0 turn portion and the 3.0 turn portion of the first wire 51. For example, the 3.0 turn portion of the second wire 52 may be located between the 3.0 turn portion and the 4.0 turn portion of the first wire 51. The same applies to the other turns. In order to obtain the effect described in the above (4), the following configuration is preferable. Assume that, in a case where M is a specific integer of 4 or more and N is an arbitrary integer of 3 or more and less than M, each of the first wire 51 and the second wire 52 has an M-th turn but does not have an (M+1)-th turn. At this time, in the direction along the central axis C, an N turn portion of the second wire 52 is preferably located between an (N−1) turn portion and an N turn portion of the first wire 51.

In the above embodiment, a part of the range of the 1.0 turn or more and less than the 2.0 turn of the first wire 51 may be in contact with the range of the 1.0 turn or more and less than the 2.0 turn of the second wire 52. The effect of (1) can be obtained as long as the 1.0 turn portion A1 of the first wire 51 is away from the 1.0 turn portion B1 of the second wire 52 in the direction along the central axis C.

In the above embodiment, the 2.0 turn portion B2 of the second wire 52 is not required to be located between the 1.0 turn portion A1 of the first wire 51 and the 1.0 turn portion B1 of the second wire 52 in the direction along the central axis C.

Further, as long as the 1.0 turn portion A1 of the first wire 51 and the 1.0 turn portion B1 of the second wire 52 are away from each other in the direction along the central axis C, the winding method of each of the wires is not limited. For example, the 1.0 turn portion B1 of the second wire 52 may be located on the side of the first negative direction X2 with respect to the 1.0 turn portion A1 of the first wire 51. The second and subsequent turns of the first wire 51 or the third and subsequent turns of the second wire 52 may be located between the 1.0 turn portion A1 of the first wire 51 and the 1.0 turn portion B1 of the second wire 52.

The coil component 10 may be manufactured in a different process and order from those in the above embodiment.

In the above embodiment, the method for manufacturing the drum core 10C prepared in the preparation process is not limited to the example in the above embodiment. For example, the drum core 10C may be formed by grinding a rectangular parallelepiped ferrite core.

Technical ideas that can be derived from the above embodiments and modification examples will be described below.

[1] A coil component including a drum core including a winding core portion having a columnar shape, a first flange portion connected to a first end of the winding core portion in a direction along a central axis, and a second flange portion connected to a second end of the winding core portion opposite to the first end. In a case where a specific direction orthogonal to the central axis is a positive direction and a direction opposite to the positive direction is a negative direction, a first electrode is located on a side of the positive direction with respect to the central axis on an outer surface of the first flange portion, a second electrode is located on a side of the negative direction with respect to the central axis on the outer surface of the first flange portion, a third electrode is located on the side of the positive direction with respect to the central axis on an outer surface of the second flange portion, a fourth electrode is located on the side of the negative direction with respect to the central axis on the outer surface of the second flange portion, a first wire is wound around the winding core portion and has a first wire end connected to the first electrode and a second wire end connected to the third electrode, and a second wire is wound around the winding core portion in an equal direction to that of the first wire and has a first wire end connected to the second electrode and a second wire end connected to the fourth electrode. Assuming that a portion of the first wire that first comes into contact with an outer peripheral surface of the winding core portion when the first wire is traced from the first wire end to the second wire end is defined as a 1.0 turn portion of the first wire, and that the number of turns increases by 1 every time the first wire makes one round about the central axis from the first wire end toward the second wire end, and assuming that a portion of the second wire where an angular position thereof about the central axis first coincides with an angular position of the 1.0 turn portion of the first wire when the second wire is traced from the first wire end to the second wire end is defined as a 1.0 turn portion of the second wire, and that the number of turns increases by 1 every time the second wire makes one round about the central axis from the first wire end toward the second wire end, the 1.0 turn portion of the first wire is located on the side of the negative direction with respect to the central axis, and is away from the 1.0 turn portion of the second wire in the direction along the central axis.

[2] The coil component according to [1], wherein a range of a 1.0 turn or more and less than a 2.0 turn of the first wire is away from a range of a 1.0 turn or more and less than a 2.0 turn of the second wire.

[3] The coil component according to [1] or [2], wherein a 2.0 turn portion of the second wire is located between the 1.0 turn portion of the first wire and the 1.0 turn portion of the second wire in the direction along the central axis.

[4] The coil component according to any one of [1] to [3], wherein, in a case where M is a specific integer of 4 or more and N is an arbitrary integer of 3 or more and less than M, each of the first wire and the second wire has an M-th turn but does not have an (M+1)-th turn, and, in the direction along the central axis, an N turn portion of the second wire is located between an (N−1) turn portion and an N turn portion of the first wire.

[5] The coil component according to any one of [1] to [4], wherein, in a case where a portion of the second wire that first overlaps with an outside of a portion of the first wire after the 1.0 turn portion when the second wire is traced from the first wire end toward the second wire end is defined as a first overlapping portion, the first overlapping portion exists within a range of a 2.0 turn or more and less than a 3.0 turn of the second wire.

[6] The coil component according to any one of [1] to [5], wherein the second wire has a cross portion that crosses a portion from the first wire end to the 1.0 turn portion of the first wire from an outside, and the cross portion exists within a range of the 1.0 turn or more and less than a 2.0 turn of the second wire.

[7] The coil component according to [6], wherein the cross portion is located on the side of the negative direction with respect to the central axis.

What is claimed is:

1. A coil component comprising:

a drum core including a winding core portion having a columnar shape, a first flange portion connected to a first end of the winding core portion in a direction along a central axis, and a second flange portion connected to a second end of the winding core portion opposite to the first end;

where a specific direction orthogonal to the central axis is a positive direction and a direction opposite to the positive direction is a negative direction, a first electrode is on a side of the positive direction with respect to the central axis on an outer surface of the first flange portion;

a second electrode is on a side of the negative direction with respect to the central axis on the outer surface of the first flange portion;

a third electrode is on the side of the positive direction with respect to the central axis on an outer surface of the second flange portion;

a fourth electrode is on the side of the negative direction with respect to the central axis on the outer surface of the second flange portion;

a first wire is wound around the winding core portion and has a first wire end connected to the first electrode and a second wire end connected to the third electrode; and a second wire is wound around the winding core portion in the same direction as the winding direction of the first wire and has a first wire end connected to the second electrode and a second wire end connected to the fourth electrode, wherein when a portion of the first wire that first comes into contact with an outer peripheral surface of the winding core portion when the first wire is traced from the first wire end to the second wire end is defined as a 1.0 turn portion of the first wire, and that a number of turns increases by 1 every time the first wire makes one round about the central axis from the first wire end toward the second wire end, and when a portion of the second wire where an angular position thereof with respect to the central axis first coincides with an angular position of the 1.0 turn portion of the first wire when the second wire is traced from the first wire end to the second wire end is defined as a 1.0 turn portion of the second wire, and that a number of turns increases by 1 every time the second wire makes one round about the central axis from the first wire end toward the second wire end, the second wire has a cross portion in which the second wire crosses the first wire from an outside of the first wire within a range from the first wire end of the first wire to the 1.0 turn portion of the first wire, and the cross portion exists within a range of the 1.0 turn of the second wire or more and less than a 2.0 turn of the second wire.

2. The coil component according to claim 1, wherein the cross portion is on the side of the negative direction with respect to the central axis.

3. The coil component according to claim 1, wherein the first wire and the second are arranged alternately in the direction along the central axis on the outer peripheral surface of the winding core portion.

4. The coil component according to claim 2, wherein the first wire and the second wire are arranged alternately in the direction along the central axis on the outer peripheral surface of the winding core portion.

5. The coil component according to claim 1, wherein where M is a specific integer of 4 or more and N is an arbitrary integer of 3 or more and less than M, each of the first wire and the second wire has an M-th turn but does not have an (M+1)-th turn, and, in the direction along the central axis, an N turn portion of the second wire is between an (N−1) turn portion of the first wire and an N turn portion of the first wire.

* * * * *